(12) United States Patent
Morris et al.

(10) Patent No.: US 7,747,695 B1
(45) Date of Patent: Jun. 29, 2010

(54) SYSTEM, METHOD AND COMPUTER READABLE MEDIUM FOR PROVIDING NOTIFICATIONS

(75) Inventors: Corey K. Morris, Mobile, AL (US); Jeffrey William Cordell, Omaha, NE (US); Robert Allen Sherry, Aurora, IL (US); Mark Clinton Knox, Lafayette, CO (US); Scott R. Mingus, Omaha, NE (US); William David Sullivan, Jr., Semmes, AL (US)

(73) Assignee: West Corporation, Omaha, NE (US)

( * ) Notice: Subject to any disclaimer, the term of this patent is extended or adjusted under 35 U.S.C. 154(b) by 168 days.

(21) Appl. No.: 11/926,878

(22) Filed: Oct. 29, 2007

(51) Int. Cl.
*G06F 15/16* (2006.01)
(52) U.S. Cl. .................. 709/206; 709/205; 709/220; 709/225; 705/5
(58) Field of Classification Search .................. 709/205, 709/206, 220, 225; 705/5
See application file for complete search history.

(56) References Cited

U.S. PATENT DOCUMENTS

| | | | | |
|---|---|---|---|---|
| 6,643,355 | B1 * | 11/2003 | Tsumpes | 379/45 |
| 6,751,657 | B1 * | 6/2004 | Zothner | 709/220 |
| 6,868,544 | B2 * | 3/2005 | Dalal et al. | 719/318 |
| 6,968,360 | B1 * | 11/2005 | Morrow et al. | 709/206 |
| 7,212,111 | B2 * | 5/2007 | Tupler et al. | 340/539.18 |
| 2004/0006497 | A1 * | 1/2004 | Nestor et al. | 705/5 |
| 2004/0225733 | A1 * | 11/2004 | Tesink et al. | 709/225 |

* cited by examiner

*Primary Examiner*—Jinsong Hu

(57) ABSTRACT

A system, method and computer readable medium for providing automated notifications generates a list of recipients. The notification preferences of the recipients is determined and a notification generated and formatted in accordance with the recipients' preferences is communicated to the recipient. The notification preferences include a notification type, such as voice, email, SMS etc. The notification may be a notification of an overdue debt which provides the recipient with an avenue to make payment of the debt.

23 Claims, 6 Drawing Sheets

SYSTEM, METHOD AND COMPUTER READABLE MEDIUM FOR PROVIDING NOTIFICATIONS

FIELD OF THE INVENTION

This disclosure relates to a system, method and computer readable medium for providing notifications to recipients. The disclosure has particular relevance to providing notifications to recipients of accounts receivables and to providing an automatic payment facility to the recipient.

BACKGROUND OF THE INVENTION

In a typical service industry such as a medical practice, legal firm or similar, a customer, e.g. patient or client, may receive a service, at which time the customer is provided with a bill for services rendered. That customer may have an option of immediately paying for the services. However, if the customer does not immediately pay the bill, the details of the bill are entered as accounts receivable of an accounting system.

The present method of notifying and collecting on accounts receivable is a manual process. The service practice may track billing and if a customer is past due, they may send a notification via mail or phone the customer. The tracking of payment is also manual.

What is required is a system, method and computer readable medium capable of providing automatic handling of customer notifications and/or accounts receivables.

SUMMARY OF THE INVENTION

In accordance with one embodiment of the disclosure, there is provided a method for providing notifications comprising: generating a notification list including at least one recipient; and for each recipient: determining at least one notification method; generating at least one notification; and providing said at least one generated notification to said recipient in accordance with said at least one notification method.

In accordance with one embodiment of the disclosure, there is provided a system for providing notifications comprising: at least one list generator; at least one preference management system; and at least one notification generator; wherein said at least one list generator generates at least one notification list comprising at least one recipient; and wherein said at least one notification generator is configured to determine at least one recipient on said notification list and to generate a notification to said recipient in accordance with one or more preferences of said recipient managed by said at least one preference management system, said one or more preferences including at least one notification type.

In accordance with one embodiment of the disclosure, there is provided a computer readable medium comprising instructions executable on at least one processor for: receiving one or more preferences of at least one responsible party including at least one notification type; generating at least one notification; determining at least one responsible party to be a recipient of said at least one notification; communicating said at least one generated notification to said at least one recipient in accordance with a notification type preference of said recipient.

BRIEF DESCRIPTION OF THE DRAWINGS

The invention will now be described, by way of example only, with reference to specific embodiments and to the accompanying drawings in which.

DETAILED DESCRIPTION OF THE INVENTION

Figure 1:
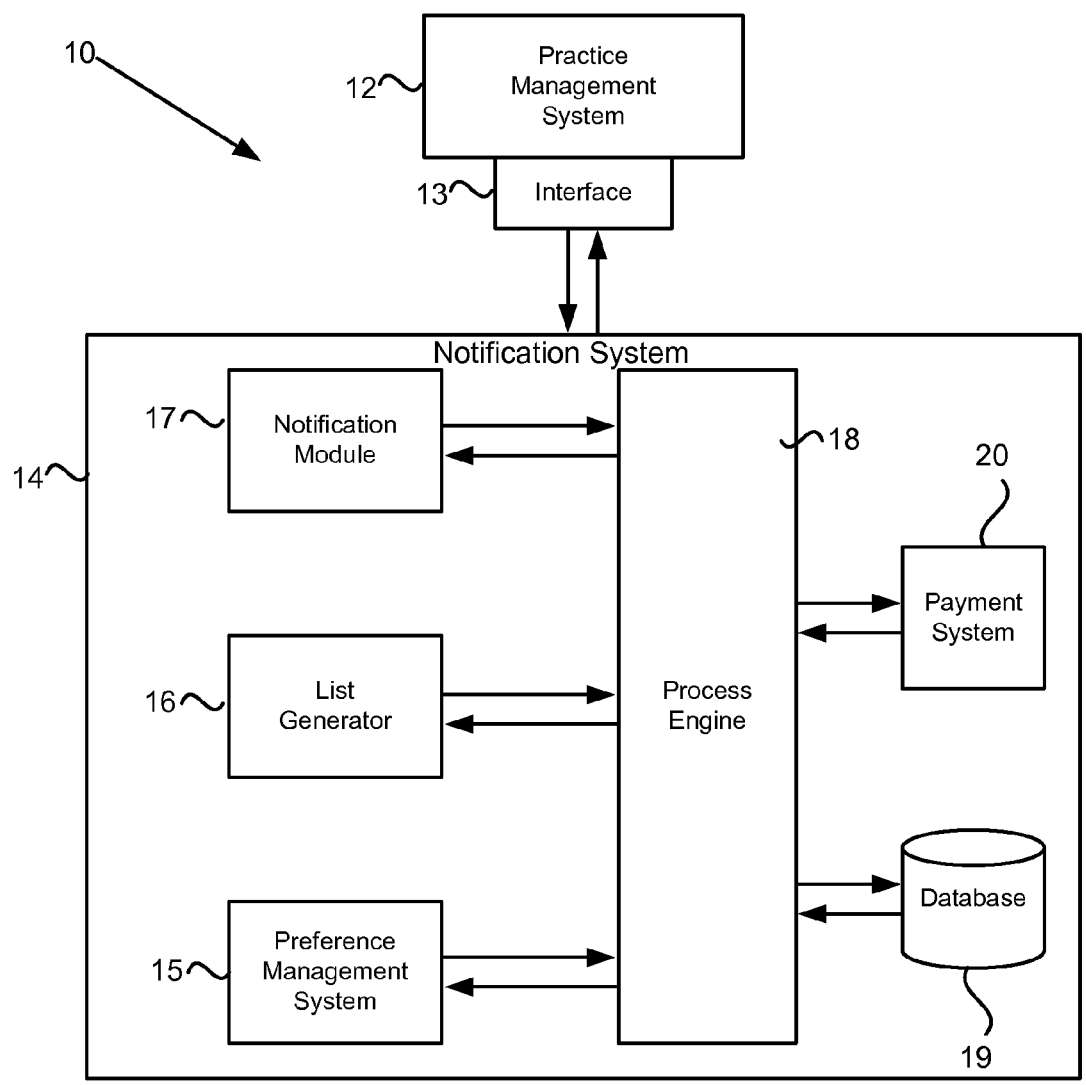
FIG. 1 schematically represents a notification system.

With reference to FIG. 1, a system 10 in accordance with an embodiment of the present invention includes a practice management system 12 and a notification system 14. The system 10 may have particular application in many service industries such as a medical or dental practice, legal firm, or similar, however it is to be understood that the scope of the system is not to be limited thereto.

The practice management system 12 is operated by a service provider, such as on the medical or dental premises and is used to manage daily activities such as tracking and scheduling appointments, billing, insurance management, etc. The practice management system 12 has an interface 13 for communication with the notification system 14 through which the practice management system 12 can exchange information regarding notifications. The practice management system 12 provides a means through which accounts receivable information can be provided.

Figure 2:
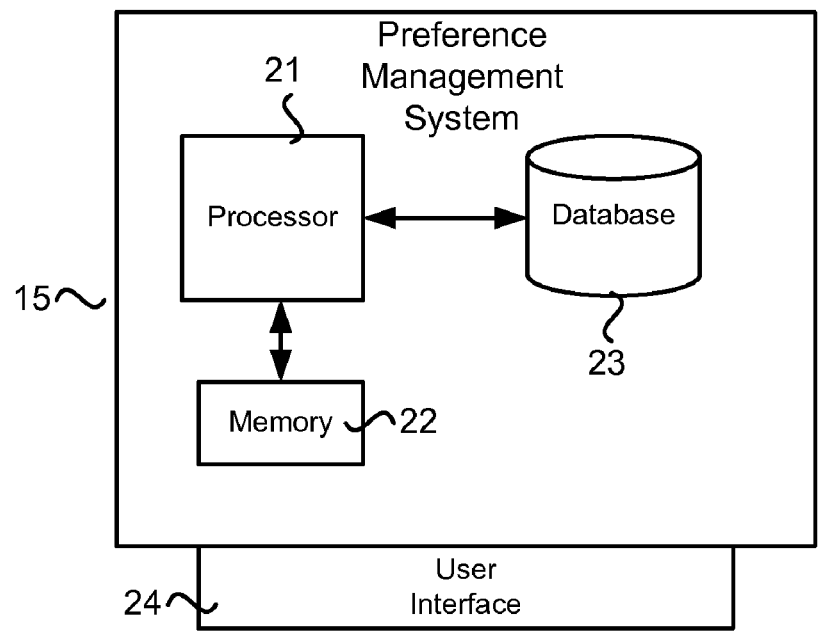
FIG. 2 schematically represents a preference management system.

The notification system 14 includes a preference management system 15, list generator 16, notification module 17, process engine 18, database 19 and payment system 20. The preference management system 15, shown in more detail in FIG. 2, includes a processor 21 operatively associated with a memory and database 23. The preference management system 15 also provides a user interface 24 which may be any suitable interactive interface such as an intranet, Internet, interactive voice response, etc. Through the user interface 24, a responsible party, e.g. a customer of the service provider or representative of the customer, is able to provide information identifying methods by which they can be notified of specific events, such as overdue accounts, appointment reminders etc. Such information may include, for example, an electronic mail address, phone number and/or a mailing address. The responsible party may also indicate that for notification matters, the system can use a number of different notification types including, but not limited to, telephone, email, SMS, MMS, fax, instant message or other type of notification or any combination. The responsible party may also order preferences such that the system may try one method first and then attempt another method. The responsible party may express preferences that are based upon time of day, day of week or other dynamic criteria. Specifying a time allows a notification method to be selected for a recipient dependent on the time of the notification. For example, a responsible party may specify one notification type, eg email, for work hours, and a different notification type, eg phone, for home hours. In a further example, a responsible party may specify a week day contact number and a weekend contact phone number. The processor 21, operating the interface 24, may receive the information from the responsible party and store the information in a record associated with the responsible party in the database 23.

In addition the service provider, such as a medical practice can register preferences regarding notifications. For example, a practice may specify that overdue account notifications are only to be reprocessed after some period (e.g. 30 days). The practice may specify human intervention based upon various criteria (e.g. time window, type of service rendered, etc.).

Figure 3:
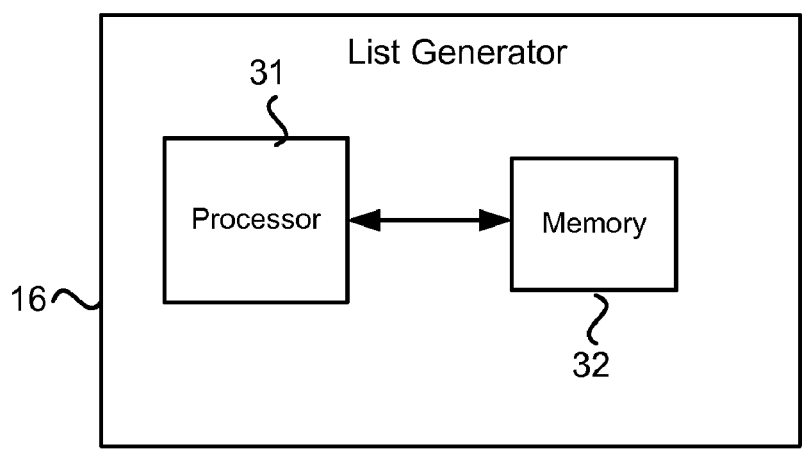
FIG. 3 schematically represents a list generator.

The list generator 16 is shown in greater detail in FIG. 3 and includes a processor 31 operatively associated with a memory 32. The list generator interfaces with the practice management system 12 to produce a notification list, such as a list of payment reminders or past due balance notifications, for further processing. The list generator 16 may operate in at least two modes. In the first mode (pull) the list generator 16 interrogates the practice management system 12 through the defined interface 13. This polling mechanism is done periodically, e.g. once per week or once per month, based upon preprogrammed parameters, including parameters specified from the practice management system 12 and/or by the service provider. The polling mechanism may retrieve multiple responsible party names during interrogation. The second mode is the push mechanism. In this mode the practice management system 12 pushes responsible party lists to the list generator 16. This may be a single responsible party or a list of responsible parties. When the list generator 16 acquires the responsible party list it passes it to the process engine 18 for processing. Appropriate security mechanisms may be required between the practice management system 12 and the list generator 16 to authenticate and authorize each party. Such security mechanisms are known and are not considered pertinent to the present disclosure.

Figure 4:
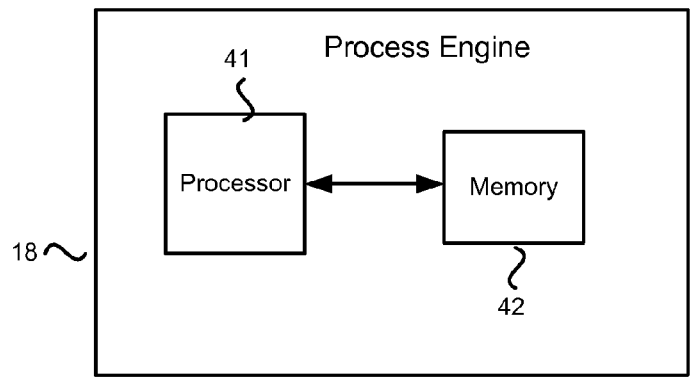
FIG. 4 schematically represents a process engine.

The process engine 18 is shown in greater detail in FIG. 4 and includes a processor 41 operatively associated with a memory 42. The processor 41 contains the sequencing logic to manage the notification system 14. The process engine 18 receives responsible party names from the list generator 16, identifies the mode of notification via the preference management system 15 and sends the notification information to the notification module 17. If the sending of the notification in accordance with a first notification method fails or if multiple modes of notification have been elected by a recipient, the process engine 18 identifies a second mode of notification and sends notification information in accordance with the second mode to the notification module 17. Further, if the second mode of notification fails, a third to an nth mode of notification can be attempted. Also, multiple modes of notification can be sent in parallel, serially, or based on an elapsed period of time including at least one of: from when the first notification method was sent, from when at least one of the second to the nth mode or method of notification was sent, a delta between a time the first notification method was sent to a time the at least one of the second to the nth mode or method of notification was sent, and a delta between a time the second to the nth mode or method of notification was sent. Still further, multiple modes of notification can be sent in parallel, serially, or based on an elapsed period of time including at least one of: a source and a destination of the first notification method and the second to the nth notification mode or method. Also, multiple modes of notification can be sent in parallel, serially, or based on an elapsed period of time including at least one of: a content and an altered content of the first notification and the second to the nth notification, wherein the content may have been altered by one or more of the sources or one or more of the destinations.

The database 19 contains dynamic information regarding active notifications. For each responsible party it maintains a state of the notification based upon where the process engine 18 is in its sequence. For example if a responsible party has two methods of notification the database may contain the knowledge that the process engine 18 has executed one method and the other method is pending. The database contains logs sufficient to trouble shoot glitches in the processing and records that may be used for billing.

Figure 5:
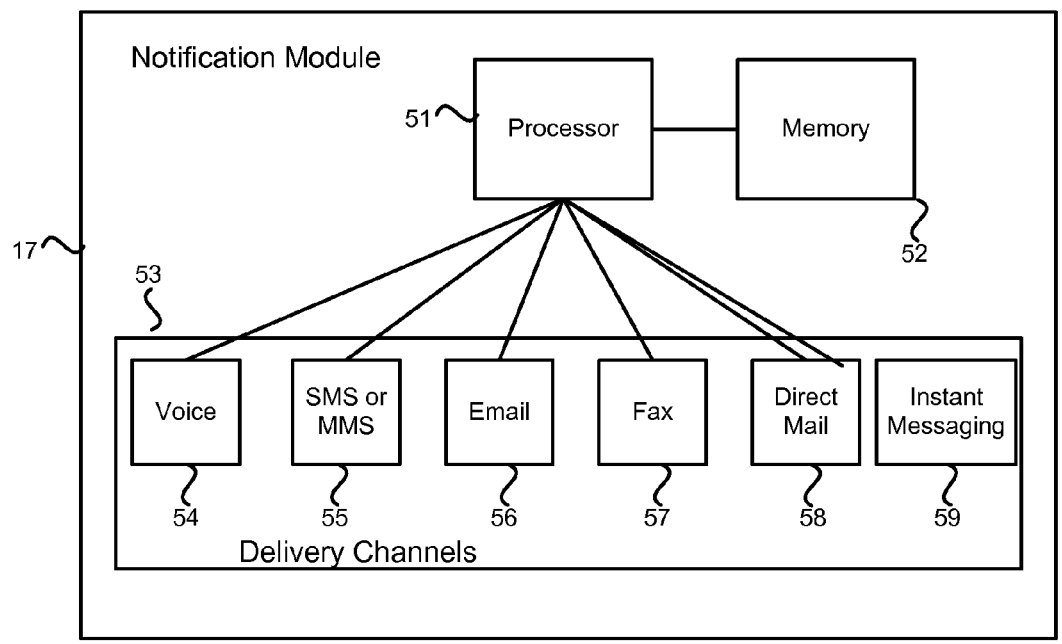
FIG. 5 schematically represents a notification module.

The notification module 17 is shown in greater detail in FIG. 5 and includes a processor 51 operatively associated with a memory 52. The processor 51 provides a delivery channel manager for a plurality of delivery channels 53. The delivery channels include channels configured for message delivery through voice 54, SMS or MMS 55, email 56, fax 57, direct mail 58, instant messaging 59 or any other suitable message delivery format. The processor 51 has the logic to notify the responsible party based upon the type of notification the responsible party expressed in the preference management system 15. For example, the processor 51 may generate customized voice messages using templates stored in the memory 52. The templates may include components specified by the practice management system 12. Similarly, the processor 51 has email capabilities and can format an email message containing the appropriate level of notification information. The person skilled in the art will understand that messages can be generated for any suitable message delivery format. Regardless of the message format, the message may include a referral to the payment system 20, as described in greater detail below.

Figure 6:
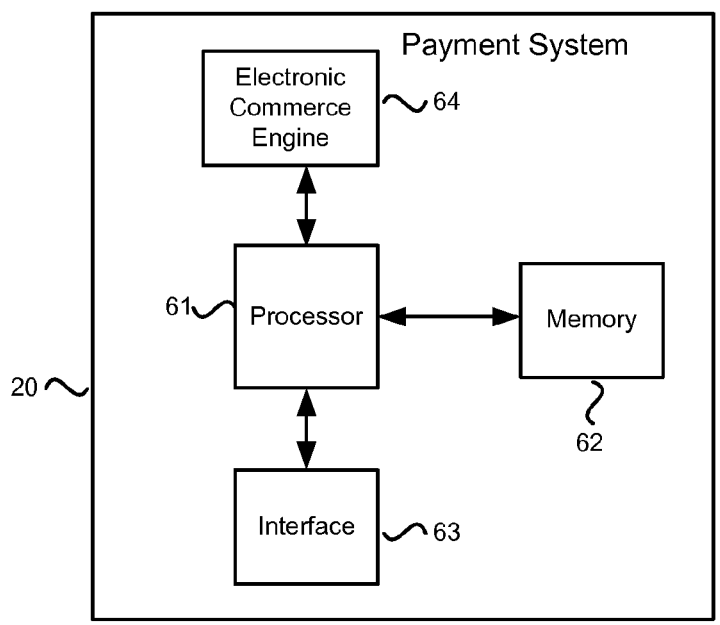
FIG. 6 schematically represents a payment system.
Figure 7:
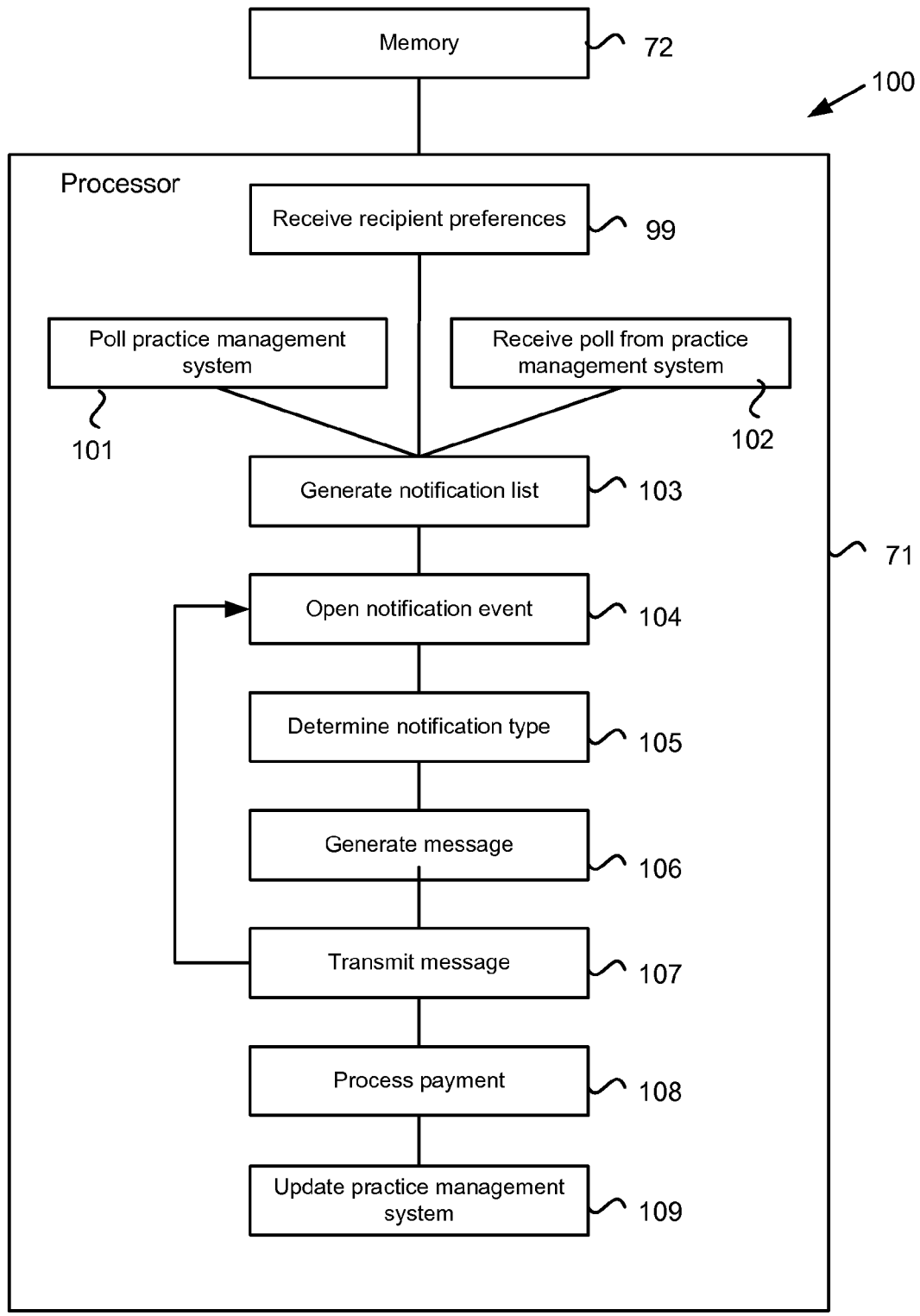
FIG. 7 illustrates a process flow diagram for providing notifications.

The payment system 20 is shown in greater detail in FIG. 6 and includes a processor 61 operatively associated with a memory 62 and an interface 63 for interfacing with a responsible party. The interface 63 may provide a web based interface, an interactive voice response based interface or any other suitable interface. The processor 61 provides the logic to prompt the responsible party for payment information and thereafter processes payment through an electronic commerce engine 64 with external links to a banking system (not shown).

In one example, the responsible party may have been referred to the payment system 20 via a hyperlink in an email notification. Once the hyperlink is activated, the processor 61 retrieves a form from memory 62 and displays the form to the responsible party through the interface 63, operating as a web interface. The form prompts the responsible party for details of the overdue debt that is to be made and account information from which a payment can be made. The processor retrieves the account information from the form and passes the account information to the electronic commerce engine 64 to enact payment of the overdue debt in a known manner. In an alternative example, the responsible party may have been referred to the payment system 20 via audio or touch tone prompts in a voice notification. Once the responsible party has activated the payment system prompts, the processor provides an interactive voice response system through the interface 63. Using the interactive voice response system, the responsible party may provide account information which is then passed to the electronic commerce engine 64 as described above. Alternatively, the responsible party may be referred to an agent to address specifics about the payment. After the agent affirms the responsible party's needs the agent may refer the responsible party as above or collect payment over the phone.

The notification system 14 may interface with the practice management system 12 such that once payment has been made and affirmed through the payment system 20, the records of the practice management system 12 are updated accordingly, thereby preventing further overdue payment notifications from being generated inappropriately.

Whilst the preference management system 15, list generator 16, notification module 17, process engine 18, database 19 and payment system 20 have been described and illustrated as individual components within the notification system 14, it is to be understood that any one or more of these components may be combined with their functionality being provided in any number of processors, including a single processor.

A specific embodiment will now be described with particular reference to an automated notification and payment system operating in conjunction with a dental practice.

A responsible party may subscribe to an automated payment system directly, that is, by interfacing directly with the preference management system 15 of the notification system 14. When a responsible party subscribes to an automated payment system, they electronically fill out forms that provide account numbers, payment preference, etc. The preferences include options to specify a method or type of notification for billing statements and issues. This would be done, for example, by the responsible party logging onto a website and entering the appropriate information through the interface 24. Other systems and methods for directly subscribing to the automated payment system will be apparent to the person skilled in the art.

Alternatively, the responsible party may subscribe to an automated payment system automatically as a customer or client of the practice. That is, data may be collected at the practice management level and uploaded to the preference management system.

A practice manager, e.g. a dentist, may also enter specific filtering criteria in the preference management system 15. Such information may include notification frequency or other specific instructions.

A method for providing automated notifications will now be described with reference to the flow diagram 100 depicted as being performed within at least one processor 71 operatively associated with at least one memory 72 of the notification system 14. The processor 71 may be a single processor, such as the processor of the process engine 18 or may be representative of distributed processors, such as made up of one or more of the processors 21, 31, 41, 51 and 61 of the modules of the notification system 14. Similarly, the memory 72 may be a single memory, such as the memory of process engine 18, or may be representative of distributed memories, such as made up of one or more of the memories 22, 32, 42, 52 and 62 of the modules of the notification system 14.

The step of receiving preference data from the responsible parties and the service providers is depicted at step 99.

The initial steps require generation of a notification list, as depicted at step 103. In the present example, the notification list is a list of responsible parties having an overdue debt which shows as an entry in the records of the practice management system 12. As described above, the notification list may be generated by the processor 71 actively polling the practice management system 12 (step 101) and any other practice management systems that the notification system 14 services.

Alternatively, the practice management system 12 may itself trigger the overdue account record in which case the processor 71 receives a polling from the practice management system 12 (step 102).

Following either the pull (101) or push (102) polling, the processor 71 receives a list of overdue records from the practice management system from which the notification list is generated (step 103). In one embodiment the polling and list generating steps are performed in the list generator 16, which authenticates the receipt of responsible party records and passes the notification list to the process engine 18.

The processor 71 opens up an event for each entry in the notification list (step 104) and sequentially begins to process each record. To process each record, the processor 71 first identifies the recipient and the type of notification that the recipient has elected to receive (step 105). In one embodiment, this step is performed by the process engine 18 interrogating the preference management system 15 to identify how the responsible party wants to be notified.

At step 106, the processor 71 formulates a message dependent on the determined notification type. The message contains responsible party information and may include specific indicators related to the delivery of the notification. For example the message may be formulated with specific messages or components to play, or data to provide, that was provided by the dentist using the preference management system. In one embodiment, the message is formulated in the process engine 18.

At step 107, the formulated message is prepared for delivery. If the notification is to be a voice call, the processor 71 makes the call and queues the appropriate recorded message. If the notification is to be email, the processor formulates the message text and images and sends it out. In one embodiment, the formulated message is passed from the process engine 18 to the notification module 17 which transmits the message through the appropriate delivery channel in accordance with the selected notification type. The notification module 17 provides feedback to the process engine 18 as it progresses. In turn the process engine 18 updates the record in the database 19.

If there are multiple options for a notification, the processor 71 sequences through those options based upon preferences stored in the preference management system. At each stage of the sequence, the database 19 is updated to track where the notification is in the notification sequence.

Once the notification is sent, the processor 71 returns to step 104 in respect of the next entry in the notification list. If a notification is to be sent in multiple formats in accordance with a sequence defined in the preference management system 15, the processor 71 may simultaneously process multiple notifications at different stages in the notification sequence, using the database 19 to track where each notification is in its respective sequence.

In the notification the responsible party is prompted to pay through a variety of mechanisms. The responsible party may elect to use the payment system 20 to complete the transaction (step 108). If the payment method is web access then the Payment System will authenticate the responsible party and prompt them through the steps. If a responsible party is to be referred to a $3^{rd}$ party then the responsible party is redirected to the $3^{rd}$ party. If the responsible party requires human interaction then the responsible party may be referred to an agent who may assist. The agent may then refer the responsible party to a $3^{rd}$ party. Other mechanisms may be deployed to take the responsible party through the process. Once the payment has been processed, feedback to the practice management system 12 (step 109) prevents the responsible party from being included on the next list. In one embodiment, the feedback is provided by the payment system 20 to the practice management system 12.

The presently described embodiments have advantage over prior art systems including automatically generating and processing the notification list, allowing responsible parties to choose their preferred notification methods, allowing the practice to specify frequency and method of balance notifications, and by providing various payment options including, but not limited to online payments, interactive voice payment systems, live agents, or $3^{rd}$ party payment processing solutions. A further advantage is that the notification system 14 can be offered as a $3^{rd}$ party service to service providers enabling the administrative task of collecting on accounts receivables to be removed from the responsibility of the service provider.

Whilst the invention has been described with particular reference to providing financial notifications to recipients, the person skilled in the art will readily understand that other types of notifications may be provided. In one embodiment, instead of generating a financial notification list, the system generates an appointment notification list including a list of customers who have an appointment within a particular timeframe, for example, the next day, the next week or the next month. The system then generates reminder messages to the customers on the appointment notification list and sends the reminder messages to the customers in accordance with data stored in the preference management system. Other types of notifications that may be generated from the data of the practice management system will be apparent to the person skilled in the art and are considered to fall within the scope of the present invention.

The person skilled in the art will readily understand that whilst individual processors have been described for each of the components of the notification system 14, embodiments in which the functions of the processors are provided in a reduced or a greater number of processors is considered to be within the scope of the invention. Furthermore, the association between the processors and between the processors and their respective memories may be provided in a local or a distributed manner.

Figure 8:
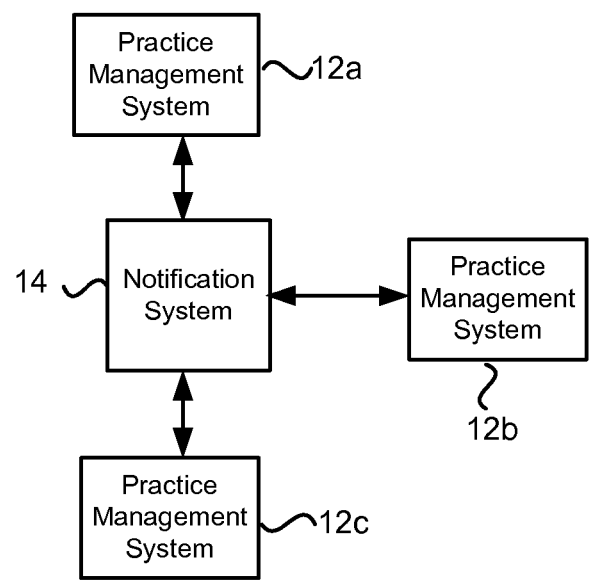
FIG. 8 schematically represents the notification system servicing multiple practice management systems.

Whilst the above embodiments and figures describe a notification system operating in conjunction with a single practice management system, the person skilled in the art will readily understand that the notification system can interface with any number of practice management systems. FIG. 8 shows the notification system 14 servicing practice management systems 12a, 12b and 12c. In servicing multiple practice management systems, a single notification list may be generated by polling (or being polled by) each practice management system and then concatenating the lists received from the respective practice management systems into a single list. Alternatively, each practice management system may be serviced sequentially.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

We claim:

1. A method for providing notifications using a processing device, the method comprising:
    generating a notification list including at least one recipient; and
    for each recipient:
    determining at least a first notification method and a second notification method;
    generating at least one notification; and
    providing said at least one generated notification to said recipient in accordance with said first notification method, and providing said generated notification to said recipient in accordance with said second notification method upon failure of said first notification method.

2. The method according to claim 1 wherein at least said first notification method and said second notification method comprises determining a time of a notification and selecting a notification method for a recipient dependent on said time of said notification.

3. The method according to claim 1 wherein generating said at least one notification list comprises polling at least one practice management system.

4. The method according to claim 3 further comprising polling a plurality of practice management systems.

5. The method according to claim 1 wherein generating at least one notification list comprises receiving a notification list from at least one practice management system.

6. The method according to claim 5 further comprising receiving a notification list from a plurality of practice management systems.

7. The method according to claim 1 wherein generating at least one notification comprises generating a voice message.

8. The method according to claim 7 wherein said voice message comprises a component provided from a practice management system.

9. The method according to claim 1 wherein generating a notification comprises providing a payment option in said notification.

10. The method according to claim 9 wherein said payment option is a hyperlink to a payment system.

11. The method according to claim 1 further comprising receiving one or more recipient preferences.

12. The method according to claim 11 wherein said one or more recipient preferences are received from at least one practice management system.

13. The method according to claim 1 wherein generating at least one notification comprises generating an overdue debt notification.

14. A system for providing notifications comprising:
    at least one list generator;
    at least one preference management system; and
    at least one notification generator;
    wherein said at least one list generator generates at least one notification list comprising at least one recipient; and
        wherein the at least one preference management system determines at least a first notification method and a second notification method,
    wherein said at least one notification generator is configured to determine at least one recipient on said notification list and to generate a notification to said recipient in accordance with said first notification method and said second notification method of said recipient managed by said at least one preference management system, wherein said at least one notification generator provides said generated notification to said recipient in accordance with said first notification method, and providing said generated notification to said recipient in accordance with said second notification method upon failure of said first notification method.

15. The system according to claim 14 wherein said at least one notification generator communicates with at least one practice management system for generating said at least one notification list.

16. The system according to claim 15 wherein said at least one notification generator communicates with a plurality of practice management systems for generating said at least one notification list.

17. The system according to claim 14 further comprising a notification system for communicating said generated notification to said recipient.

18. The system according to claim 14 wherein said notification includes a notification of a debt, said system further comprising a payment system for allowing a recipient to provide a payment on said debt.

19. A computer hardware storage medium comprising instructions executable on at least one processor for:
receiving one or more preferences of at least one responsible party including at least one notification type;
generating at least one notification;
determining a recipient, from the at least one responsible party, of said at least one notification;
determining at least a first notification method and a second notification method based on one or more preferences of the recipient; and
communicating said at least one generated notification to said at least one recipient in accordance with said first notification method, and communicating said at least one generated notification to said recipient in accordance with said second notification method upon failure of said first notification method.

20. The computer hardware storage medium according to claim 19 further comprising instructions for receiving one or more preferences of at least one service provider; wherein said at least one responsible party is determined in accordance with one or more preferences provided by a service provider.

21. The computer hardware storage medium according to claim 20 further comprising instructions for communicating with a practice management system of said at least one service provider to determine said at least one responsible party to be a recipient.

22. The computer hardware storage medium according to claim 21 wherein said at least one notification comprises a notification of an overdue debt, and wherein determining at least one responsible party to be a recipient comprises communicating with a practice management system to determine any responsible party having an overdue debt above a predetermined amount.

23. The computer hardware storage medium according to claim 21 wherein determining said at least one responsible party to be a recipient is performed at a frequency specified in said one or more preferences provided by said service provider.

* * * * *